United States Patent [19]

Timofeev et al.

[11] 4,167,442
[45] Sep. 11, 1979

[54] SYSTEM FOR RECHARGING FUEL ASSEMBLIES OF NUCLEAR REACTOR

[76] Inventors: Alexandr V. Timofeev, ulitsa Strazh Revoljutsii, 24, kv. 9; Vladimir I. Batjukov, ulitsa Prygunova, 9, kv. 29; Alexandr I. Fadeev, ulitsa Engelsa, 21, kv. 46; Alexandr F. Shapkin, ulitsa Zvezdinka, 3, kv. 64; Tsolak G. Shkhiyan, naberezhnaya imeni Zhdanova, 6, kv. 16; Georgy V. Ordynsky, ulitsa Strazh Revoljutsii, 9/6, kv. 9; Viktor P. Drachev, ulitsa Lesokhimikov, 3, kv. 3; Evgeny N. Pogodin, ulitsa Frezernaya, 17, all of Gorky, U.S.S.R.

[21] Appl. No.: 797,379

[22] Filed: May 16, 1977

[51] Int. Cl.² .................. G21C 19/20; B66C 17/08
[52] U.S. Cl. ........................................ 176/30; 414/146
[58] Field of Search ..................... 176/30, 31, 32; 252/301.1 W, 301.15; 214/18 N

[56] References Cited

U.S. PATENT DOCUMENTS

| | | | |
|---|---|---|---|
| 3,765,549 | 10/1973 | Jones | 176/30 |
| 3,883,012 | 5/1975 | Jones | 176/30 |
| 3,904,048 | 9/1975 | Santen | 176/30 |
| 3,941,259 | 3/1976 | Hoffmeister | 176/30 |
| 3,943,037 | 3/1976 | Siegert | 176/30 |
| 4,069,098 | 1/1978 | Wade | 176/30 |
| 4,069,766 | 1/1978 | Bernstein | 176/30 |

Primary Examiner—Stephen C. Bentley
Assistant Examiner—Donald P. Walsh
Attorney, Agent, or Firm—Fleit & Jacobson

[57] ABSTRACT

A system for recharging fuel assemblies of a nuclear reactor, comprising a hermetically sealed chamber on whose bottom there is placed a movable platform of a recharging machine which charges the reactor with new fuel assemblies, removes spent fuel assemblies from the reactor, and transports spent fuel assemblies from the reactor to a place of storage, as well as new fuel assemblies from the place of storage to the reactor. In the bottom of the hermetically sealed chamber there are provided channels through which it communicates with an intermediary distribution chamber arranged in the reactor vessel and the places for storing spent and new fuel assemblies. Between the channels of the reactor vessel and the channel of the container for storing spent fuel assemblies, i.e. on the path along which spent fuel assemblies are transported, in the bottom of the hermetically sealed chamber there is provided a jut, whereupon there is placed a series of movably interconnected cars with overhead covers between adjoining cars which are moved into and out of the hermetically sealed chamber through a hermetically sealed hatch.

8 Claims, 12 Drawing Figures

SYSTEM FOR RECHARGING FUEL ASSEMBLIES OF NUCLEAR REACTOR

The present invention relates to nuclear power engineering and, more particularly, to systems for recharging fuel assemblies of nuclear reactors.

The invention is applicable to recharging fuel assemblies of nuclear reactors, including fast breeders, wherein the coolant is liquid metal.

The rapid industrial development calls for more power and necessitates the designing and construction of a large network of atomic power stations. In the course of operation of such stations, it is necessary to periodically replace spent fuel assemblies by new ones, i.e. recharge fuel assemblies of a nuclear reactor. In fast breeders, periodic recharging of fuel assemblies requires sophisticated systems of recharging mechanisms. In most fast breeders, the operations of recharging fuel assemblies fall into the following three groups:

operations of the first group consist in the transfer of fuel assemblies from the reactor core to an intermediary distribution chamber located in the reactor vessel;

operations of the second group include the removal of spent fuel assemblies and installation of new fuel assemblies, and the transfer of these between the intermediate distribution chamber and containers for storing spent and new fuel assemblies;

operations of the third group include manipulations carried out outside the reactor vessel and involving the preparation of new and treatment of used fuel assemblies.

The present invention relates to a system for recharging fuel assemblies, which is intended for carrying out operations of the second group, i.e. the transfer of fuel assemblies between an intermediary distribution chamber located inside the reactor vessel and containers for storing new and spent fuel assemblies, located outside the reactor vessel. The arrangement of mechanisms incorporated in the recharging system is to protect the personnel from the radiation of fuel assemblies and the coolant, as well as make these mechanisms accessible for maintenance and repair.

There are known systems for recharging fuel assemblies of a nuclear reactor, comprising a hermetically sealed chamber which ensures biological protection of personnel, in whose bottom there are provided channels to communicate the hermetically sealed chamber with the reactor vessel and containers for storing new and spent fuel assemblies. In the course of operation of the nuclear reactor, these channels are closed by radiation-proof sealing means which open the channels for recharging operations. On the outside of the hermetically sealed chamber, there is mounted a driving mechanism of a recharging machine which is located inside the hermetically sealed chamber. The recharging machine comprises a a manipulator tube, inside which there is a tank to receive a fuel assembly. The tank moves inside the manipulator tube and is lowered through the channels into an intermediary distribution chamber of the reactor vessel and the containers for new and used fuel assemblies filled with coolant which is liquid metal. In the course of the recharging operations, the tank is lowered below the coolant level, whereupon a fuel assembly is placed in it. The tank with the fuel assembly is then raised and drawn into the manipulator tube. The manipulator tube with the tank moves between the channels provided in the reactor vessel and the container for storing spent fuel assemblies. As this takes place, the coolant which remains on the fuel assembly being transferred trickles down onto the bottom of a box.

There is known another system for recharging fuel assemblies of a nuclear reactor, comprising a hermetically sealed chamber of a material which ensures biological shielding of personnel from radiation. In the bottom of the chamber there are provided channels, through which said hermetically sealed chamber communicates with the reactor vessels and containers for storing new and spent fuel assemblies. During operation of the reactor, the channels are plugged by sealed radiation-proof plugs-Prior to recharging, the plugs are raised to the lid of the hermetically sealed chamber to open the channels. On the outside of the hermetically sealed chamber there is arranged a driving mechanism for driving, through drive shafts, the mechanisms of a recharging machine located inside the hermetically sealed chamber. The recharging machine comprises a movable platform which runs on rails provided between the channels. Mounted on the platform is a reduction gear intended to move in the vertical direction a manipulator tube installed inside said reduction gear. Mounted on the manipulator tube is another reduction gear for vertically moving, with the aid of a chain, a grip installed in the manipulator tube.

In the course of recharging fuel assemblies, the grip and manipulator tube are successively lowered into the channels in the reactor vessel. The grip gets hold of a fuel assembly, raises it above the coolant level and draws it into the manipulator tube. The manipulator tube with the fuel assembly is raised into the hermetically sealed chamber and leaves the channel. The movable platform with the manipulator tube then moves between the channels and transfers the spent fuel assembly. While the spent fuel assembly is being transferred from the intermediary distribution chamber of the reactor vessel to the container for storing spent fuel assemblies, the radioactive coolant, which remains inside the fuel assembly and on its outer surface, trickles down onto the bottom of the hermetically sealed chamber (the coolant is liquid metal).

In the known systems for recharging fuel assemblies of a nuclear reactor, the radioactive coolant, which trickles from the tank for transporting fuel assemblies or from fuel assemblies themselves, pollutes the bottom of the hermetically sealed chamber. This makes the mechanisms of the recharging system hard-to-get-at for maintenance and repair and involves the danger of exposing the personnel to radiation. Removal of the coolant from the bottom of the hermetically sealed chamber is technically difficult and involves radiation exposure hazards.

It is an object of the present invention to reliably protect the personnel during operation and maintenance of the mechanisms of the recharging system, and make these mechanisms readily accessible for maintenance and repair.

The foregoing object is attained by providing a system for recharging fuel assemblies of a nuclear reactor, comprising a hermetically sealed chamber in whose bottom there are provided channels, through which the hermetically sealed chamber communicates with the reactor vessel and containers for storing new and spent fuel assemblies, said hermetically sealed chamber also housing a recharging machine which includes a movable platform carrying a first reduction gear which serves to move a manipulator tube in the vertical plane, a grip arranged inside the manipulator tube, a second reduction gear mounted on the manipulator tube and intended to vertically move the grip arranged inside said manipulator tube, a third reduction gear mounted on the movable platform to move the latter inside the hermetically sealed chamber, and a driving mechanism located outside the hermetically sealed chamber and coupled to said reduction gears, in which system the bottom of the hermetically sealed chamber is provided, according to the invention, with a guide placed on the path along which a fuel assembly is transported from the channel in the reactor vessel to the channel of the container for storing spent fuel assemblies, on which guide there is mounted at least one tank introduced into and withdrawn from the hermetically sealed chamber through a sealed hatch.

It is expedient that the tanks should be constructed as a plurality of movably interconnected cars provided with guiding means to direct the cars along a jut-type guide, and that between the adjacent end walls of adjoining cars there should be provided an overhead cover spanning the spacing therebetween.

The cars can be coupled with the aid of a joint comprising a hook mounted on one of the end walls of a car and coupled to an eyebar mounted on the adjacent end wall of the next car.

It is preferable that the cars should be coupled together by flexible cables attached by means of end loops to pulleys mounted on the side walls of each car.

The proposed recharging system prevents the trickling of coolant from fuel assemblies onto the bottom of the hermetically sealed chamber; the invention also provides for rapid, remotely controlled removal of coolant from the hermetically sealed chamber; finally, the invention ensures radiation safety of personnel during operation and maintenance of the mechanisms of the recharging system, and provides ready access to these mechanisms.

Other objects and advantages of the present invention will become more apparent from the following detailed description of a preferred embodiment thereof to be read in conjunction with the accompanying drawings, wherein.

Figure 1:
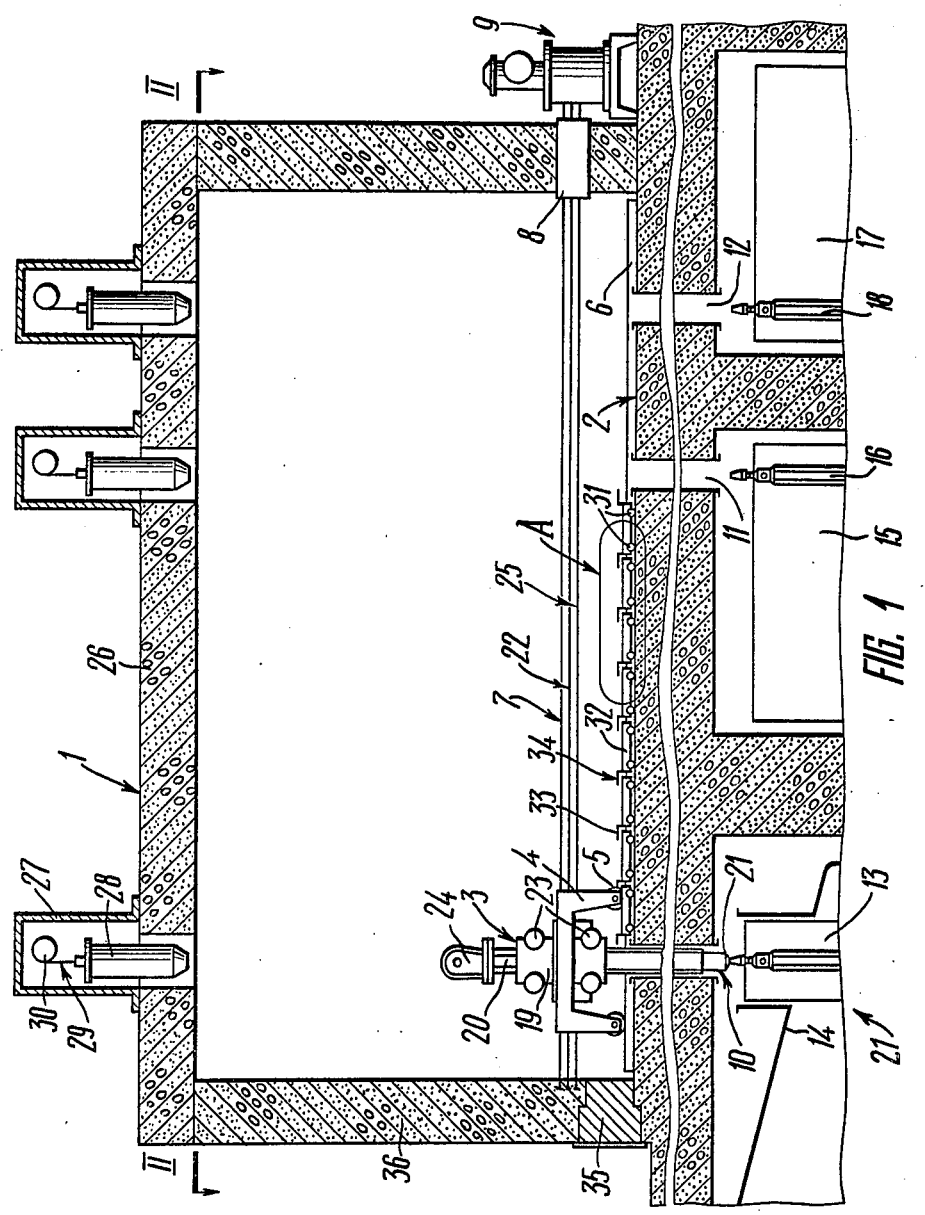
FIG. 1 is an elevation view of a system for refuelling a nuclear reactor, in accordance with the invention.

Referring now to the accompanying drawings, the proposed system for refuelling a nuclear reactor comprises a hermetically sealed chamber 1 (FIG. 1) of a material which ensures biological protection of personnel from radiation. On a bottom 2 of said chamber 1 there is mounted a recharging machine 3 comprising a movable platform 4 having wheels 5 which run on rails 6 placed on the bottom 2. The platform 4 is driven by a drive shaft 7 which is coupled through a sealed gear 8 to a driving mechanism 9 located outside the hermetically sealed chamber 1. In the bottom 2 of the hermetically sealed chamber 1 there are provided channels 10, 11 and 12 through which the chamber 1 communicates with an intermediary distribution chamber 13 of a reactor vessel 14, a container 15 for storing spent fuel assemblies 16, and a container 17 for storing new fuel assemblies 18, respectively.

On the movable platform 4 there is rigidly mounted a first reduction gear 19 which serves to vertically move a manipulator tube 20 with a grip 21 and thus transport new fuel assemblies 18 or spent fuel assemblies 16. The first reduction gear 19 is coupled through a drive shaft 22 and the sealed gear 8 to the driving mechanism 9; due to this kinematic connection, the manipulator tube 20 can be moved in the vertical direction inside the first reduction gear 19 in guide rollers 23. Inside the manipulator tube 20, there is movably arranged the grip 21, whereto through a second reduction gear 24, a drive shaft 25 and the sealed gear 8 there is transmitted progressive motion in the vertical direction inside the manipulator tube 20. On a lid 26 of the hermetically sealed chamber 1, in sealed jackets 27, there are installed sealing plugs 28 for sealing off the channels 10, 11 and 12. The sealing plugs 28 are manufactured from a material which protects personnel from radiation, and are suspended with the aid of cables 29 on winches 30 inside the sealed jackets 27. On the bottom 2 of the hermetically sealed chamber 1 there are placed cars 32 which are hingedly coupled to one another and can run on wheels 31 on said bottom 2. The cars 32 are manufactured from a material which is resistant to the effects of high temperatures and the coolant which is liquid metal. Arranged between the adjacent end walls of each pair of adjoining cars 32 are overhead covers 33, each constructed, for example, as a bent sheet of a material similar to that of the cars 32, which may be metal. The overhead cover 33 is mounted (welded, for example) on one of the end walls of each car 32 and spans the spacing 34 between adjoining cars 32.

The height of the cars 32 is less than the distance between the bottom 2 and the bottom of the platform 4, so the cars 32 can freely pass under the platform 4, between its wheels 5. It is possible to direct the movement of the cars 32 between the channels 10 and 11 and direct said cars 32 into, or withdraw them from the hermetically sealed chamber 1, which can be done with the aid of very simple means, for example, a hook (not shown in FIG. 1).

Figure 2:
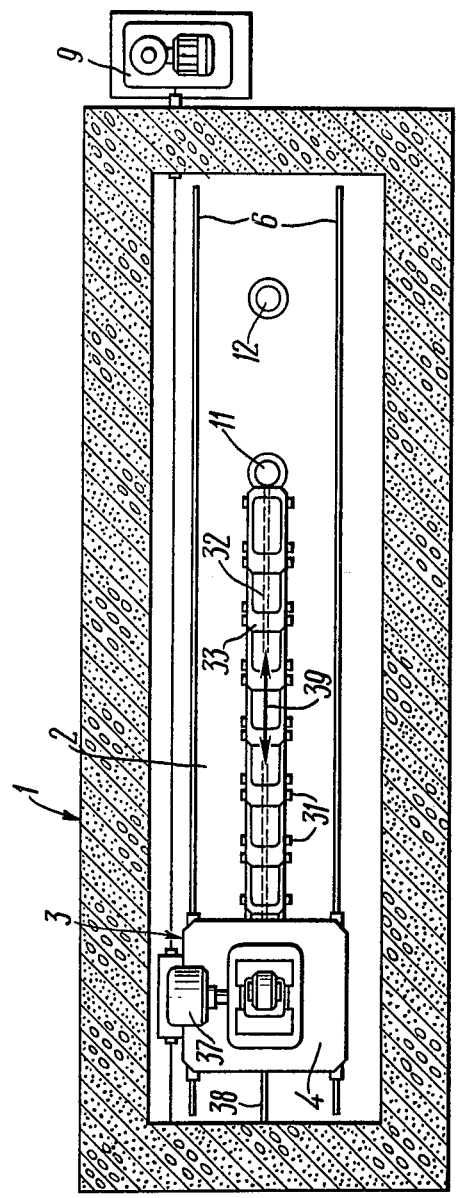
FIG. 2 is a sectional view taken on line II—II of FIG. 1.

FIG. 2 is a plan sectional view of the hermetically sealed chamber 1. FIG. 2 shows that the cars 32 are placed between the channel 10 (FIG. 1) of the intermediary distribution chamber 13 and the channel 11 (FIG.

2) of the container 15 for storing spent fuel assemblies 16. On one side of the movable platform 4 there is suspended a third reduction gear 37 which transmits rotary motion from the driving mechanism 9 through the sealed gear 8 (FIG. 1) and drive shafts 22 and 25 to the first and second reduction gears, 19 and 24, respectively; with the aid of the drive shaft 7, said third reduction gear 37 sets the movable platform 4 (FIG. 2) into progressive motion, so that the platform 4 moves on rails 6 along the hermetically sealed chamber 1. The train of cars 32 is placed on a guide constructed as a jut 38 extending along the path (see an arrow 39) along which the recharging machine 3 moves between the channels 10 (FIG. 1) and 11.

Figure 3:
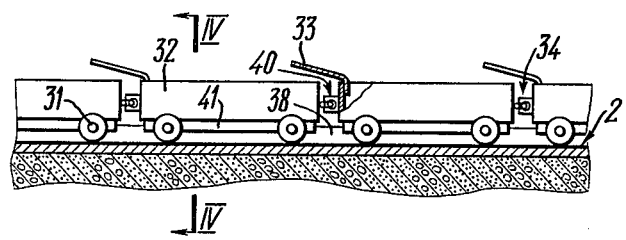
FIG. 3 is a view of hingedly coupled cars (unit A of FIG. 1), in accordance with the invention.
Figure 4:
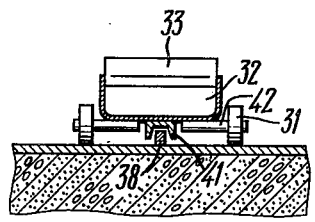
FIG. 4 is a sectional view taken on line IV—IV of FIG. 3.
Figure 5:
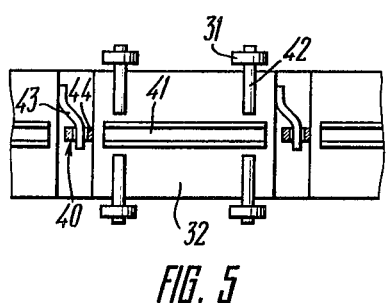
FIG. 5 is a bottom view of hingedly coupled cars, in accordance with the invention.
Figure 6:
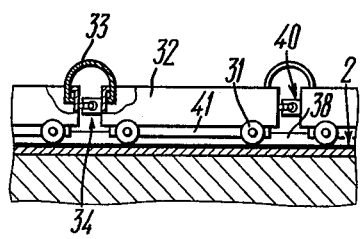
FIG. 6 shows an embodiment of the overhead cover in accordance with the invention.

FIG. 3 shows on a magnified scale, as compared to FIG. 1, a part of the train of cars 32 interconnected by means of a hinge unit 40 and the overhead covers 33 which span the spacing 34 between adjoining cars 32. Under the bottom of each car 32, between the wheels 31, there is fixed (for example, welded) a guide means 41 constructed as a channel to receive the jut 38 protruding from the bottom 2 of the hermetically sealed chamber 1 (FIG. 1). The wheels 31 (FIG. 4) of the cars 32 have bearings mounted on axles 42 which are rigidly secured to the bottoms of the cars 32. The wheels 31 run directly on the bottom 2. The arrangement of the cars 32 in the train is determined by the configuration of the jut 38, which corresponds to the path 39 (FIG. 2) followed by the recharging machine 3. FIG. 5 is a bottom view of a part of the train of cars 32. According to FIG. 5, the hinge unit 40 is a hook 43 inserted into an eyebar 44. Hinged coupling of the cars 32 to one another makes it possible to combine them into a train extending along the path 39 (FIG. 2) of any desired configuration. FIG. 6 shows an alternative embodiment of the overhead covers 33 to span the spacing 34 between the cars 32. In this case the overhead covers 33 are constructed as arched braces attached to two adjacent end walls of adjoining cars 32.

Figure 7:
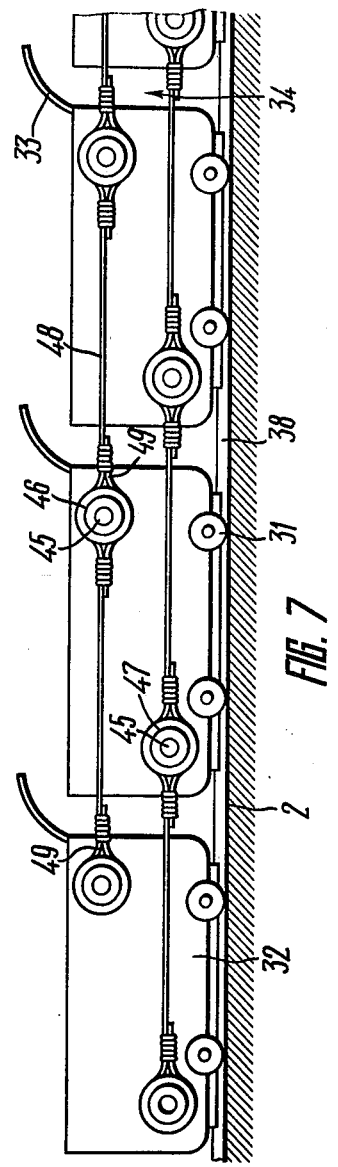
FIG. 7 shows the coupling of cars by means of flexible cables, in accordance with the invention.

FIG. 7 shows another way in which the cars 32 can be combined into a train. On each side wall of each car 32 there are rotatably mounted on axles 45 an upper pulley 46 and a lower pulley 47. The like pulleys of adjoining cars 32 are coupled by flexible cables 48 of an equal length. At each end of said flexible cables 48 there is provided a loop 49.

Figure 8:
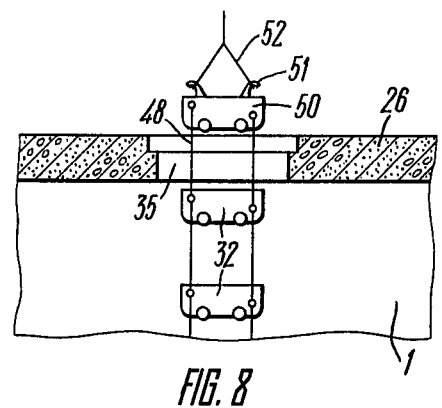
FIG. 8 shows an arrangement of a train of cars coupled by flexible cables in the sealed hatch provided in the lid of the hermetically sealed chamber, in accordance with the invention.

FIG. 8 shows a train of cars 32 being withdrawn from the hermetically sealed chamber 1 through the sealed hatch 35 provided in the lid 26 of the hermetically sealed chamber 1. Rigidly fixed to the side walls of a carrier car 50 are hoisting hooks 51, whereto there are attached cables 52 of a hoisting means (not shown in FIG. 8).

Figure 9:
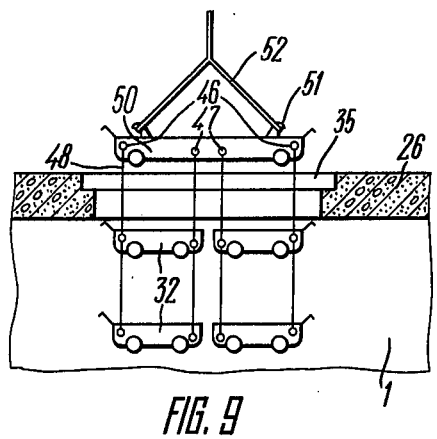
FIG. 9 shows an arrangement of cars in the wake of a carrier car placed in the middle of the train of cars, in accordance with the invention.

FIG. 9 also shows a train of cars 32, as it is being withdrawn from the hermetically sealed chamber 1. According to this embodiment, the hoisting hooks 51 are mounted on the carrier car 50 placed in the middle of the train of cars 32, whose length is at least double that of the cars 32. The carrier car 50 is provided with pairs of upper pulleys 46 and lower pulleys 47, wherefrom the cars 32 are suspended on flexible cables made, for example, of steel.

Figure 10:
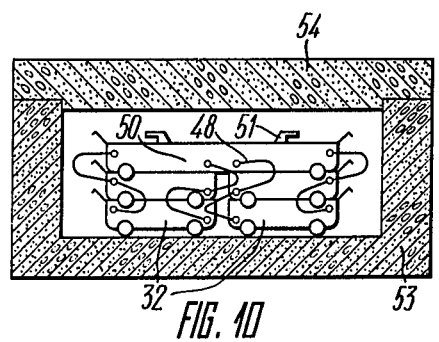
FIG. 10 shows an arrangement of a train of cars in a protective container, in accordance with the invention.

FIG. 10 is a view of a container 53 with a lid 54. Said container 53 is intended to ensure biological shielding and houses a compactly arranged train of cars 32 with the carrier car 50.

Figure 11:
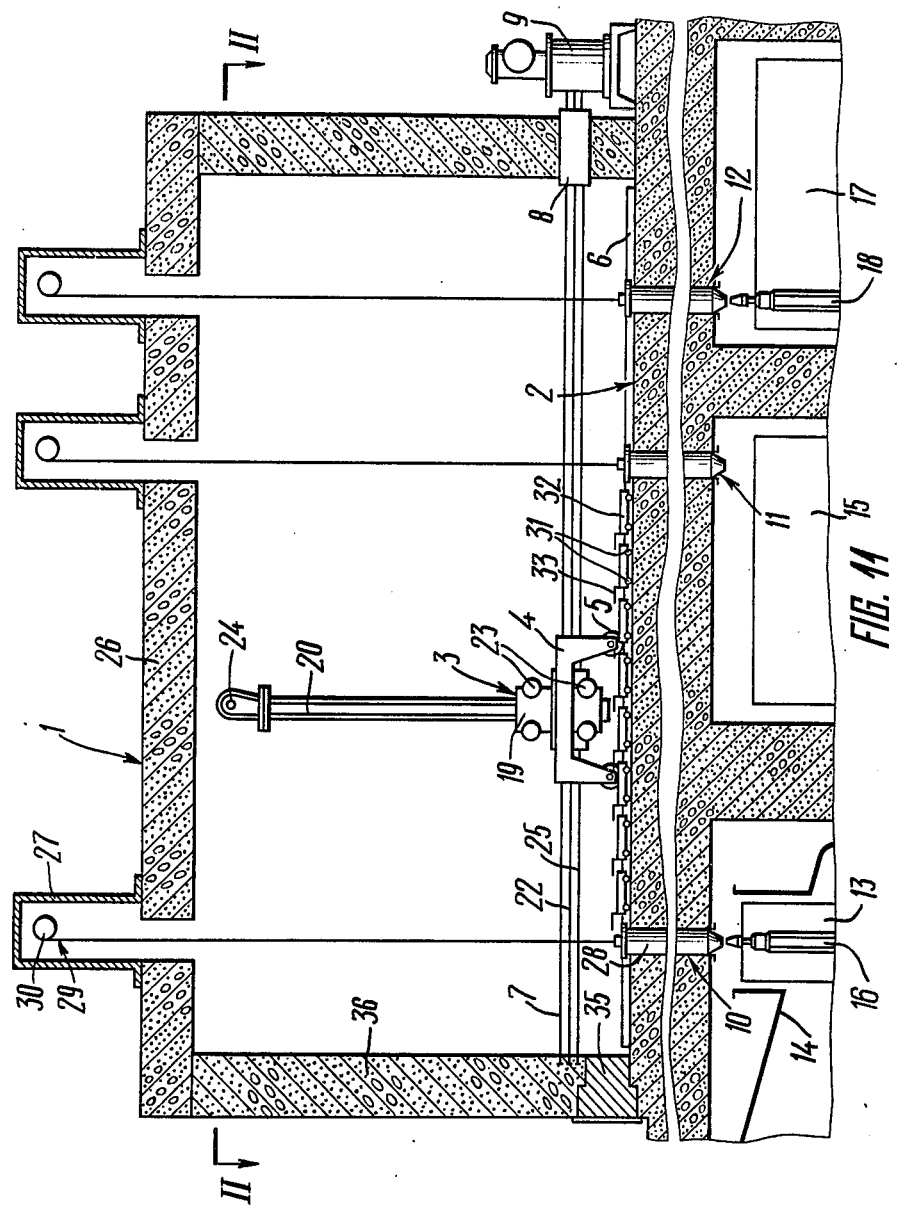
FIG. 11 is a general elevation view of a refuelling system of a nuclear reactor prior to the start of operation, in accordance with the invention.
Figure 12:
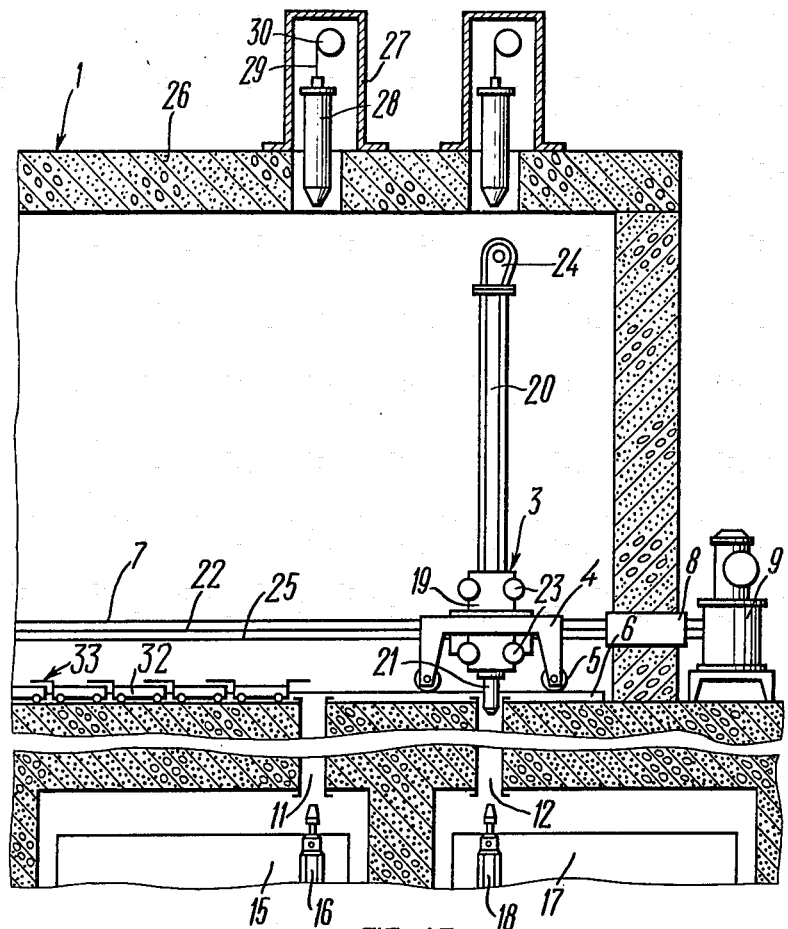
FIG. 12 is an elevation view of a portion of the hermetically sealed chamber, in accordance with the invention.

The proposed recharging system operates as follows. In the initial state, the recharging machine 3 (FIG. 11) is in its intermediate position, for example, between the channels 11 and 10 inside the hermetically sealed chamber 1. The sealing plugs 28 are inserted into the channels 10, 11 and 12, thus sealing them. Prior to the start of recharging operations the sealing plugs 28 are lifted by the winches 30 and cables 29 and withdrawn into the sealed jackets 27, whereby the recharging machine 3 is given access to the channels 10, 11 and 12 (FIG. 1). The driving mechanism 9 transmits progressive motion through the drive shaft 7 and intermediary reduction gear 37 (FIG. 2) to the platform 4 of the recharging machine 3 inside the hermetically sealed chamber 1. The platform 4 (FIG. 12) moves on the rails 6 so that the axis of the manipulator tube 20, mounted on the platform 4, is matched with the axis of the channel 12 of the container 17 for storing new fuel assemblies 18. The grip 21, which is movably arranged inside the manipulator tube 20, is in its extreme upper position inside said manipulator tube 20. The driving mechanism 9 moves the grip 21 in the vertical direction through the drive shaft 25 and the second reduction gear 24. The grip 21 is lowered inside the manipulator tube 20 into its extreme lower position (FIG. 12).

Through the drive shaft 22 and the first reduction gear 19, the driving mechanism 9 moves the manipulator tube 20 in the vertical direction. The manipulator tube 20 is lowered (this is not shown in FIG. 12) into the channel 12 of the container 17, and the grip 21 gets hold of a new fuel assembly 18. Through the drive shaft 25 and the second reduction gear 24, the driving mechanism 9 vertically moves the grip 21 inside the manipulator tube 20, so that the grip 21 and the new fuel assembly 18 are forced into the manipulator tube 20. The latter then assumes its extreme upper position and leaves the channel 12. The platform 4 runs on the rails 6 inside the hermetically sealed chamber 1 so that the manipulator tube 20 becomes coaxial with the channel 10 (FIG. 1) of the reactor vessel 14. The manipulator tube 20 and grip 21 are then lowered, and the new fuel assembly 18 is installed in the intermediary distribution chamber 13. The manipulator tube 20 and grip 21 are successively raised into their extreme upper positions. The manipulator tube 20 with the grip 21 is then arranged coaxially with the spent fuel assembly 16 in the intermediary distribution chamber 13 of the reactor vessel 14. This is done by moving the platform 4. By successively moving the grip 21, the manipulator tube 20 and the movable platform 4, the spent fuel assembly 16 is transported from the intermediary distribution chamber 13 to the container 15 for storing spent fuel assemblies 16. As the movable platform 4 and the manipulator tube 20 with the spent fuel assembly 16 inside it move along the path 39 (FIG. 2) between the channels 10 and 11, the coolant (i.e. the molten metal) trickles from the spent fuel assembly 16 into the cars 32 resting on the bottom 2 of the hermetically sealed chamber 1. Part of the coolant drops on the overhead covers 33 and trickles therefrom into the cars 32. The remaining spent fuel assemblies 16 are replaced by the new fuel assemblies 18 in a similar manner. Following the completion of all the recharging operations, the recharging machine 3 (FIG. 11) assumes its intermediary position between the channels 10 and 11 inside the hermetically sealed chamber 1, and the plugs 28 are lowered, thus sealing the channels 10, 11 and 12. The sealed hatch 35 in the wall 36 of the hermetically sealed chamber 1 is then opened, and through this hatch 35 the train of the cars 32 filled with coolant is withdrawn from the hermetically sealed chamber 1, by using some means, for example, a hook engaged with the eyebar of the end car 32. The cars 32 are then cleaned and rearranged on the path 39 (FIG. 2) along which the spent fuel assemblies 16 are transported. This is done by moving the cars 32 through the hatch 35 and directing them along the jut 38. At this time personnel may enter the chamber 1 for periodic checks and maintenance of the recharging system.

If the cars 32 are movably interconnected by means of the flexible cables 48 (FIG. 7), the train of the cars 32 is withdrawn from the chamber 1 through the hatch 35 (FIG. 8) provided in the lid 26 of said chamber 1. The carrier car 50 with its hoisting hooks 51 is the end car in the train. The cables 52 of the hoisting means (not shown) are lowered through the hatch 35 into the chamber 1 and attached to the hoisting hooks 51 of the carrier car 50. The hoisting means lifts the carrier car 50. The carrier car 50 is connected by means of the flexible cables 48 to the adjoining car 32 which first moves on the bottom 2 of the chamber 1 along the jut 38 to occupy the place of the carrier car 50 and is then lifted after said carrier car 50 and suspended on the flexible cables 48. All the following cars 32 are also interconnected by the flexible cables 48 and are all lifted and suspended on the cables 48 (as is shown in FIG. 8) to form a chain of cars suspended one below another. All the flexible cables 48 are of an equal length, so each car 32 is suspended in a strictly horizontal position, which rules out escape of the coolant.

The carrier car 50 (FIG. 9) may be placed in the middle of the train, but in this case it must be at least twice as long as any of the cars 32. Also in this case the length of the chain of the suspended cars 32 and the carrier car 50 is only half the length in the previously discussed case.

This train of cars 32 is withdrawn from the chamber 1 and installed in the container 53 (FIG. 10), whose lid has been removed in advance. The flexible cables 48 are loose, and the cars 32 are compactly placed one upon another. The one on top is the carrier car 50. The cables 52 are removed from the hooks 51 of said carrier car 50. The container 53 is covered with the lid 54 and transported to the cleaning premises. The cars 32 and 50 are freed from the coolant and re-arranged along the jut 38 in the hermetically sealed chamber 1 (FIG. 1).

In this case the height of the container 53 (FIG. 10) is only one half of the height shown in FIG. 8, although the width of the hatch 35 and the container 53 is greater. Any of the above embodiments of the cars 32, as well as any of the above ways of connecting them into a train can be selected, depending upon specific requirements imposed upon the arrangement of the recharging mechanisms and the layout of the auxiliary premises for servicing these mechanisms.

What is claimed is:

1. A system for recharging fuel assemblies of a nuclear reactor, the fuel assemblies being surrounded by coolant when positioned in the reactor, which system includes:
   a first container for spent fuel assemblies;
   a second container for new fuel assemblies;
   an intermediary distribution chamber for receiving spent and new fuel assemblies;
   a hermetically sealed chamber having a bottom;
   a first channel provided in said bottom of said hermetically sealed chamber, through which said hermetically sealed chamber communicates with said intermediary distribution chamber, said intermediary distribution chamber being arranged outside said hermetically sealed chamber;
   a second chamber provided in said bottom of said hermetically sealed chamber, through which the latter communicates with said first container for storing spent fuel assemblies, said first container being located outside said hermetically sealed chamber;
   a third channel provided in said bottom of said hermetically sealed chamber, through which the latter communicates with said second container for storing new fuel assemblies, said second container being located outside said hermetically sealed chamber;
   a guide located in a lower portion of said hermetically sealed chamber on a path along which spent fuel assemblies are transported from said first channel to said second channel;
   a recharging machine located inside said hermetically sealed chamber for transporting fuel assemblies between said first, said second, and said third channels, said machine including:
      a movable platform positioned for movement along said path,
      a manipulator tube mounted on said movable platform,
      a grip movably arranged inside said manipulator tube for gripping a fuel assembly to be transported,
      a first reduction gear mounted on said movable platform for moving said manipulator tube in a vertical direction between raised and lowered positions,
      a second reduction gear mounted in said manipulator tube for vertically moving said grip inside said manipulator tube, and
      a third reduction gear mounted on said movable platform for moving said movable platform inside said hermetically sealed chamber, said manipulator tube being moved to the raised position prior to movement of said movable platform;
   a driving mechanism coupled to said first, second and third reduction gears and located outside said hermetically sealed chamber for driving said recharging mechanism;
   tank means separate from said recharging machine mounted below said platform for movement on said guide, said tank means intercepting and storing coolant falling towards said floor during transport of fuel assemblies; and
   said hermetically sealed chamber having a sealed hatch through which said tank means is moved into and out of said hermetically sealed chamber.

2. A system for recharging fuel assemblies of a nuclear reactor as claimed in claim 1, wherein said tank means comprises a plurality of movably interconnected cars, each of said cars having a bottom, end walls and side walls interconnecting said end walls; wherein said guide is constructed as a jut; wherein guide means are attached to said bottom of each of said cars for directing said cars along said jut; wherein the cars are interconnected with a spacing between adjoining cars; and wherein an overhead cover is arranged between adjacent end walls of adjoining cars, which spans said spacing between said adjoining cars.

3. A system for recharging fuel assemblies of a nuclear reactor as claimed in claim 2, wherein said cars are coupled together by means of joints, each joint being comprised of a hook attached to one of said adjacent end walls and an eyebar engageable by the hook attached to the adjacent end wall of the adjoining car.

4. A system for recharging fuel assemblies of a nuclear reactor as claimed in claim 2, wherein pulleys are mounted on said side walls of said cars; and wherein flexible cables having loops provided at each end are attached to said pulleys to interconnect said cars.

5. In a system for recharging fuel assemblies positioned in a coolant within a nuclear reactor comprising a first container for spent fuel assemblies; a second container for new fuel assemblies; an intermediary distribution chamber for spent and new fuel assemblies; a hermetically sealed housing having a bottom with channels formed therein adapted to connect the housing to the first, the second, and the intermediary chambers; and a mechanism positioned in said housing for removing fuel assemblies from said chambers, for transporting removed fuel assemblies along a predetermined path between said chambers, and for inserting transported fuel assemblies into said chambers, the mechanism including a platform spaced from the bottom of the housing, the improvement comprising a guide positioned on the bottom of the housing in alignment with the predetermined path; and tank means separate from said mechanism and positioned below said platform for movement on said guide, said tank means receiving and storing coolant falling towards the bottom of the sealed housing during transport of fuel assemblies.

6. In a system as claimed in claim 5, the improvement wherein said housing includes port means defining an opening for removing said tank means from said housing, and lifting means positioned adjacent said port means for lifting said tank means through said port means.

7. In a system as claimed in claim 6, the improvement wherein said tank means includes a plurality of interconnected, spaced-apart cars forming a chain, and wherein the lifting means is engageable with one of the cars to lift the tank means through the port means, the cars being interconnected in such manner that cars other than the engaged cars are suspended in an upright position beneath the engaged car as the tank means is being lifted.

8. In a system as claimed in claim 7, the improvement wherein the engaged car is centrally located in the chain of cars and has a length equal to at least twice the length of the other cars in the chain, the other cars being suspended in two lines beneath the engaged car as the tank means is being lifted.

* * * * *